United States Patent [19]
Yamanaka

[11] Patent Number: 5,852,954
[45] Date of Patent: Dec. 29, 1998

[54] BICYCLE CRANK ARM PARTS/ASSEMBLY AND ASSEMBLY TOOLS

[75] Inventor: Masahiro Yamanaka, Izumisano, Japan

[73] Assignee: Shimano, Inc., Osaka, Japan

[21] Appl. No.: 890,690

[22] Filed: Jul. 11, 1997

Related U.S. Application Data

[62] Division of Ser. No. 687,203, Jul. 25, 1996.

[30] Foreign Application Priority Data

| Aug. 4, 1995 | [JP] | Japan | 7-219835 |
| Feb. 8, 1996 | [JP] | Japan | 8-046657 |

[51] Int. Cl.⁶ ............................. C22B 26/00; B25B 13/48
[52] U.S. Cl. ........................... 74/594.1; 81/176.1; 81/436; 81/459; 74/594.2
[58] Field of Search ............................. 74/594.1–594.6; 81/176.1, 436, 451, 488, 459; 29/264

[56] References Cited

U.S. PATENT DOCUMENTS

| 1,389,997 | 9/1921 | Sedgwick . | |
| 1,753,780 | 4/1930 | Fisher | 29/264 X |
| 2,446,846 | 8/1948 | Noble | 189/36 |
| 3,740,814 | 6/1973 | Marshall | 81/53.2 |
| 4,201,120 | 5/1980 | Segawa | 74/594.2 |
| 4,300,411 | 11/1981 | Segawa | 74/594.2 |
| 4,331,043 | 5/1982 | Shimano | 74/594.2 |
| 4,732,060 | 3/1988 | Stein | 81/57.4 |
| 4,738,551 | 4/1988 | Chi | 384/519 |
| 4,811,626 | 3/1989 | Bezin | 74/594.1 |
| 4,960,017 | 10/1990 | Hsiao | 81/459 |
| 5,099,726 | 3/1992 | Hsiao | 81/459 |
| 5,172,615 | 12/1992 | Albrecht | 81/436 |
| 5,181,437 | 1/1993 | Chi | 74/594.1 |
| 5,281,003 | 1/1994 | Herman | 301/2.5 |
| 5,363,721 | 11/1994 | Hsiao | 74/594.1 |
| 5,493,937 | 2/1996 | Edwards | 74/594.1 |

FOREIGN PATENT DOCUMENTS

| 0 485 954 A1 | 5/1992 | European Pat. Off. . |
| 0 565 747 A1 | 10/1993 | European Pat. Off. . |
| 934104 | 5/1948 | France . |
| 1056870 | 3/1954 | France . |
| 1273107 | of 1961 | France . |
| 2272295 | 12/1975 | France . |
| 2501615 | 9/1982 | France . |
| 719766 | of 1942 | Germany . |
| 1509090 | 4/1978 | United Kingdom . |

OTHER PUBLICATIONS

European Search Report for EP 96305711.2, dated Jan. 24, 1997.

*Primary Examiner*—Vinh T. Luong
*Attorney, Agent, or Firm*—James A. Deland

[57] ABSTRACT

A tool for fixing a chainwheel to a crank arm assembly of the type wherein a crank axle mounting section of a crank arm mounts to an end of a crank axle. The crank axle mounting section includes a threaded outer surface, and a nut is provided for fixing the chainwheel to the crank axle mounting section. The nut includes a plurality of nut splines disposed on an outer peripheral surface thereof and a threaded inner peripheral surface for meshing with the threaded outer surface of the crank axle mounting section. The tool includes a tool-mount member shaped to be held and turned by a second tool, wherein the tool-mount member defines an opening for receiving the crank axle therethrough. An operating member is formed as one-piece with the tool-mount member and has a plurality of splines extending from an inside surface thereof for meshing with the plurality of nut splines. An auxiliary tool having first and second ends has a grip section disposed in close proximity to the first end, wherein the grip section has a diameter greater than or equal to a diameter of an end of the crank axle. A support section adjacent to the grip section has a diameter less than a diameter of the opening of the tool-mount member so that the support section is fitted within the opening.

4 Claims, 10 Drawing Sheets

BICYCLE CRANK ARM PARTS/ASSEMBLY AND ASSEMBLY TOOLS

This is a division of application Ser. No. 08/687,203 filed Jul. 25, 1996 pending.

BACKGROUND OF THE INVENTION

The present invention is directed to a bicycle crank axle, a crank arm, and a crank set that offer high mounting precision and fastening strength, and that contribute to lighter weight. It also relates to a bolt and assembly tools used for assembling these components.

In conventional mounting mechanisms for the crank arms and crank axle in a bicycle, both ends of the crank axle are shaped into essentially square columns, a square hole is made in each crank arm, and the two are fitted together to fasten the crank arm onto the axle. The precision of centering afforded by the conventional mechanism for fitting together the crank arms and the crank axle is inadequate, and the strength of the linkage in the direction of rotation is inadequate as well. The problem of inadequate linkage strength is particularly notable where an aluminum alloy hollow pipe structure has been adopted for the crank axle, or where an aluminum alloy hollow structure has been adopted for the crank arms in order to reduce weight.

SUMMARY OF THE INVENTION

The present invention is directed to a bicycle crank axle, a crank arm, and a crank set that offer high mounting precision and fastening strength, but also contribute to lighter weight. Novel bolt and assembly tools used are for installing and removing these components so that assembly and disassembly may be accomplished very easily.

In one embodiment of the present invention, a crank axle includes an axle body having first and second ends, a first rotary linkage member disposed at the first end of the axle body for nonrotatably fitting a first crank arm thereto, and a first centering structure disposed at the first end of the axle body in close proximity to the first rotary linkage member. If desired, the rotary linkage member may be formed as a plurality of splines, and the same structure may be formed at the second end. A crank arm for fitting to the crank axle includes a crank axle mounting section having a centering structure for centering the crank axle mounting section to an end of a crank axle, and a rotary linkage member for nonrotatably fitting the crank axle mounting section to the end of the crank axle. If desired, the rotary linkage member for the crank arm may comprise splines that mesh with splines on the end of the crank axle. Such a structure provides secure linking of the crank arm to the crank axle without adding excessive weight.

To facilitate removal of the crank arm, a special bolt is used to fix the crank arm to the crank axle. The bolt includes a head, a threaded section having a diameter greater than or equal to the head, and a flange disposed between the head and the threaded section. The flange preferably has a diameter greater than the diameter of the threaded section, and the head defines a multiple-sided tool-engaging hole which extends axially into the threaded section to maximize the tool engaging surface. The crank axle mounting section of the crank arm preferably includes a stop ring or similar structure located so that the flange of the bolt is disposed between the stop ring and the first end of the axle body. As a result, the bolt flange presses the crank arm apart from the crank axle when the bolt is loosened.

Special tools may be provided to allow easy installation and removal of the components. For example, a tool that can be used for both fixing the axle to the bicycle and fixing a chainwheel to the crank arm includes a tool-mount member shaped to be held and turned by a tool, wherein the tool-mount member defines an opening for receiving a portion of the axle body therethrough. An operating member having a plurality of splines formed on an inside surface thereof is coupled to the tool-mount member. The splines may engage corresponding splines on a mounting adapter for the crank axle or corresponding splines on a nut used to fix a chainwheel to the crank arm. In the latter case, an auxiliary tool may be provided to ensure stable operation of the tool. The auxiliary tool may include a grip section disposed in close proximity to a first end thereof, wherein the grip section has a diameter greater than or equal to a diameter of an end of the crank axle. A support section may be disposed adjacent to the grip section and sized to fit within the opening in the tool-mount member. A second end of the auxiliary tool has a threaded inner peripheral surface which can engage with the bolt used to mount the crank arm to the axle. In this case the bolt serves to temporarily fix the main and auxiliary tool to the crank arm so that the main tool can reliably tighten the chainring fixing nut.

DETAILED DESCRIPTION OF THE EMBODIMENTS

Figure 1:
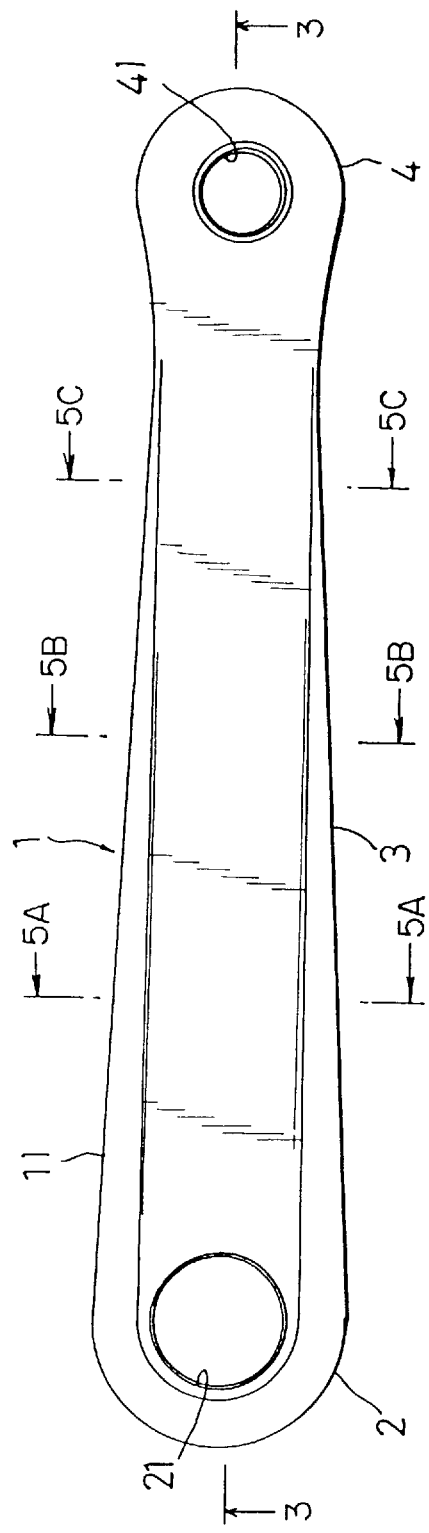
FIG. 1 is a front view of a particular embodiment of a crank arm according to the present invention.

FIG. 1 is a front view of a particular embodiment of a crank arm 1 according to the present invention. In this embodiment, the crank arm 1 is fabricated from an aluminum alloy. As shown in FIG. 1, the crank arm end on the pedal mounting side 4 is narrow, and the crank arm end on the crank axle mounting side 2 is wide. Varying the width of the crank arm 1 depending on the position in this way ensures that the stress bearing on crank arm is essentially constant at any point. A chamfered section 11 is formed at the front sides of the crank arm 1. The size of the chamfer is greater in proximity to the crank arm end on the crank axle mounting side 2 and becomes continuously smaller towards the crank arm end on the pedal mounting side 4. The front surface of the crank arm 1 can be inscribed with the manufacturer's logo, a trademark indicating the product name, or the like using laser marking or other means.

Figure 6:
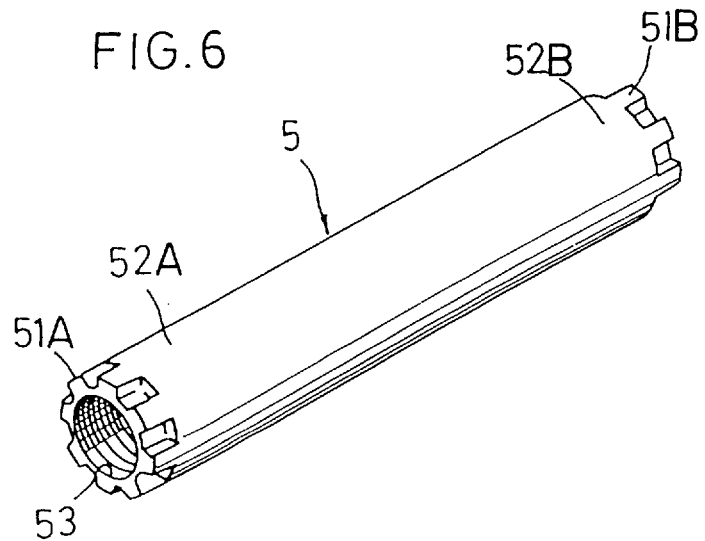
FIG. 6 is an oblique view of a particular embodiment of a crank axle according to the present invention for use with the crank arm shown in FIG. 1.

A crank axle mounting hole 21 for mounting the crank arm 1 onto the crank axle 5 is formed on the crank axle mounting side 2 of the crank arm 1. The crank arm 1 is mounted onto the crank axle 5 using this crank axle mounting hole 21 as illustrated in FIG. 6. A pedal mounting hole 41 is formed at the crank arm end on the pedal mounting side 4 of the crank arm 1. The pedal (not shown) is mounted in this pedal mounting hole 41.

Figure 2:
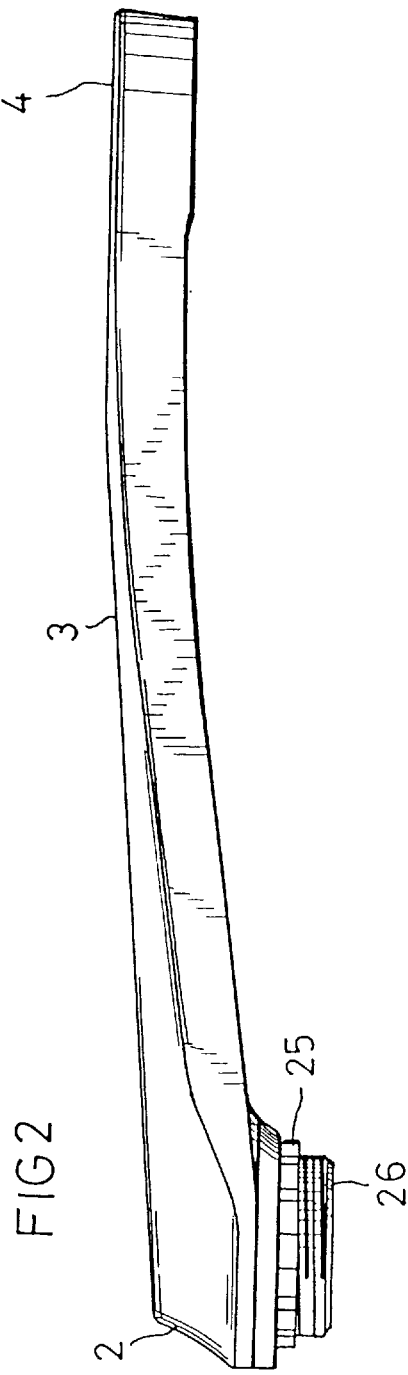
FIG. 2 is a side view of the crank arm shown in FIG. 1.
Figure 3:
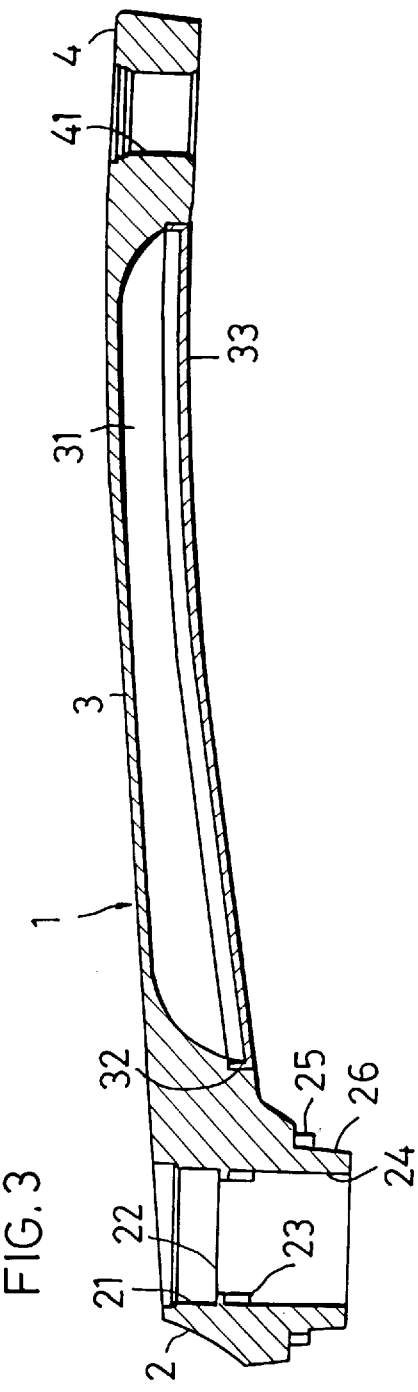
FIG. 3 is view taken along line 3—3 in FIG. 1.

FIG. 2 is a side view of the crank arm shown in FIG. 1, and FIG. 3 is a longitudinal cross sectional view of the crank arm shown in FIG. 1. As shown in those figures, a groove 31 that extends in the lengthwise direction is formed on the back surface of the central section 3 of the crank arm. The shape of the groove 31 is such that in proximity to the two ends of the groove 31, the depth of the groove becomes progressively smaller towards each end, with the groove depth reaching a minimum at each end. Thus, the bottom surface of the groove may be termed a "ship hull shape". The bottom surface of the groove 31 in its central section is essentially parallel to the front surface of the central section 3 of the crank arm.

A stepped section 32 is formed at the open side of the groove 31. A cap member 33 is inserted into this stepped section 32, and the cap member 33 is affixed at its perimeter to the body of the crank arm 1 by inert gas welding using argon gas. The front surface of the body of the crank arm 1 and the surface of the cap member 33 are flush. The pad produced in welding should be removed by machining or other means in order to make the surface flush.

A crank axle mounting hole 21 is formed on the crank axle mounting side 2. The inside wall of the crank axle mounting hole 21 has a flange 22 that projects inward, and female splines 23 which are contiguous with the back surface of this flange 22. The section of the crank axle mounting hole 21 located closer to the back surface than the splines 23 constitutes the centering member 24. The centering member 24 can be straight, with an inside diameter that does not vary in the axial direction, but more commonly has a tapered shape whose inside diameter flares out towards the back. The taper angle is 2° to 3°. Male splines 25 for locking the chainring 6 in place are formed on the outer periphery of the basal portion of the protruding section located on the back surface of the crank arm end of the crank axle mounting side 2. A thread 26 for affixing the chainring 6 is formed on the outer periphery of the protruding section on the back surface.

Figure 4:
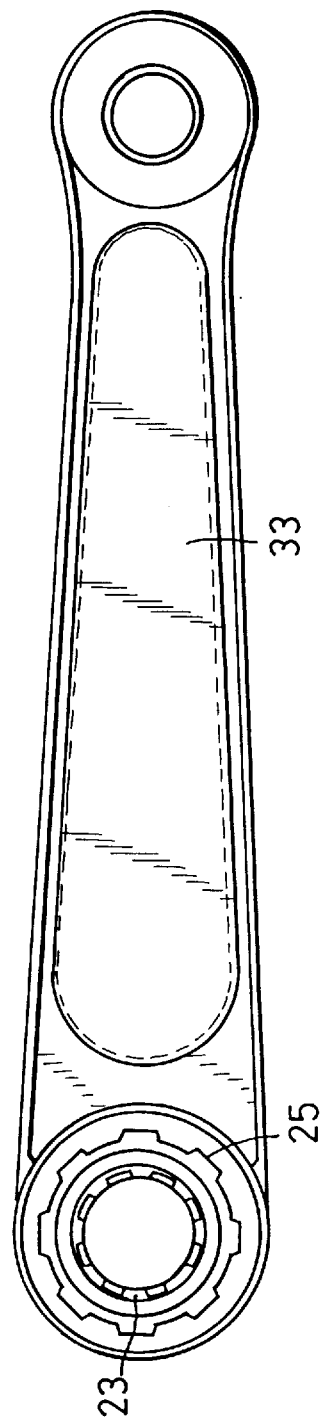
FIG. 4 is a rear view of the crank arm shown in FIG. 1.

FIG. 4 shows the crank arm 1 viewed from the back. As shown in FIG. 4, the splines 23 and 25 each comprise eight teeth. Too few teeth results in inadequate linkage strength on the part of the rotary linkage member. Providing too many teeth requires complex machining and entails higher costs, and increases the probability of errors in distribution and positioning in the direction of rotation.

Figure 5A:
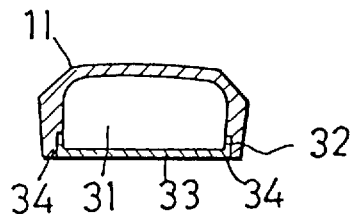
FIG. 5A–5C are cross sectional views taken along lines 5A—5A, 5B—5B AND 5C—5C, respectively, in FIG. 1.
Figure 5B:
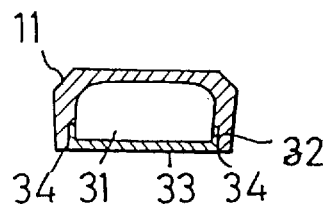
Figure 5C:
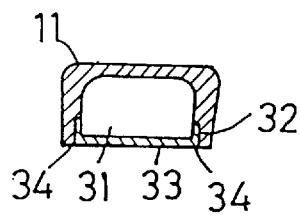

FIGS. 5A–5C are cross sectional views taken along lines 5A—5A, 5B—5B and 5C—5C, respectively, in FIG. 1. As shown in those figures, the groove 31 constitutes the majority of the cross section interior in the central section 3 of the crank arm in order to decrease the weight.

FIG. 6 shows the exterior of the crank axle 5. Centering members 52A,52B are formed at each end of the crank axle 5. The centering members 52A,52B can be straight, with a diameter that does not vary, but they usually have a tapered shape which narrows at the ends. The taper angle is 2° to 3°. Male splines 51A,51B are provided further towards the end from the centering members 52A,52. The splines 51A,51B have an eight-tooth design. The peripheral surfaces of the splines form a continuous surface with the peripheral surfaces of the centering members 52A,52B. The shape of each spline 51A,51B is basically square, with the planes of the sides being essentially parallel. The linking force in the direction of rotation is borne by planes which are essentially orthogonal to the direction of force, so chatter is largely eliminated.

Figure 7:
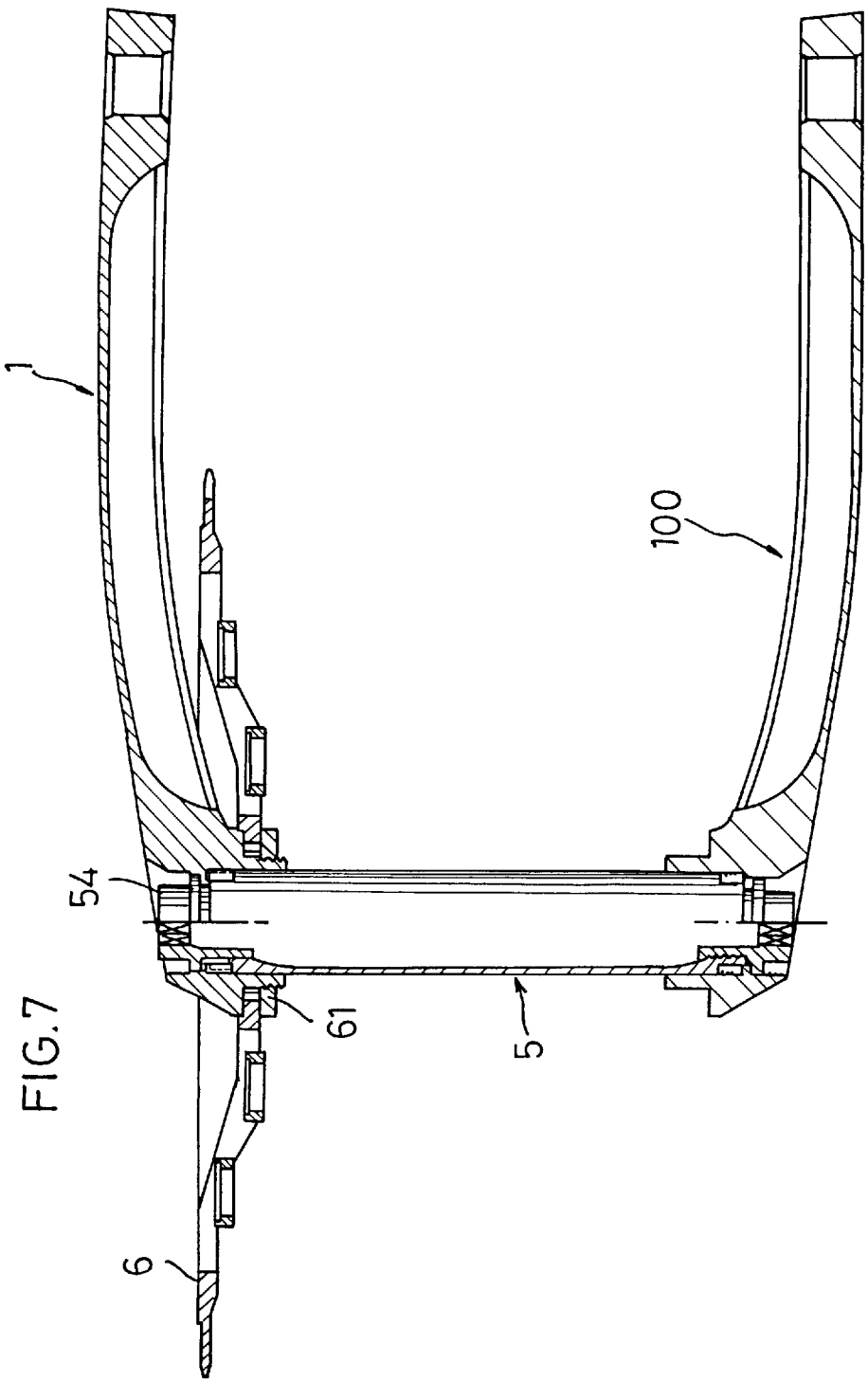
FIG. 7 is a cross sectional view of right and left side crank arms attached to the crank axle shown in FIG. 6.

The end surfaces of the crank axle 5 are provided with internal threads 53 for affixing the crank arms 1. The crank axle 5 is a hollow pipe whose wall is thinner in the central section than at the two ends, as shown in FIG. 7. In this embodiment, an aluminum alloy is used as the material for the crank axle 5. This, together with the fact that the axle is hollow, contributes to reduced weight.

FIG. 7 depicts the crank axle 5, the crank arms 1,100, and the chainring 6 in assembled form. The chainring 6 is mounted onto the crank arm 1 on one side, locked in place by the splines 25, and fixed with a nut 61. The crank arm 1 to which the chainring 6 has been affixed is mounted onto one end of the crank axle 5 and affixed by a bolt 54. The crank arm 100 without a chainring attached is affixed to the other end of the crank axle 5. The centering members 24 of the crank arms 1,100 fit tightly with the centering members 52A,52B of the crank axle 5 so that the components are centered with high precision. The female splines 23 of the crank arms 1,100 mesh with the male splines 51A,51B of the crank axle 5 to afford a linkage having high strength in the direction of rotation.

The centering members 52A,52 of the aforementioned crank axle 5 and the centering members 24 of the crank arms 1,100 have tapered junctions, so the two tapered surfaces fit together tightly. It is therefore necessary to use a removal tool in order to remove the crank arm 1,100 from the crank axle 5. However, the alternative embodiment depicted in FIG. 8 is designed so that a bolt 54 that fastens the crank axle 5 and the crank arm 1 (or 100) can be used to release the components.

Figure 12:
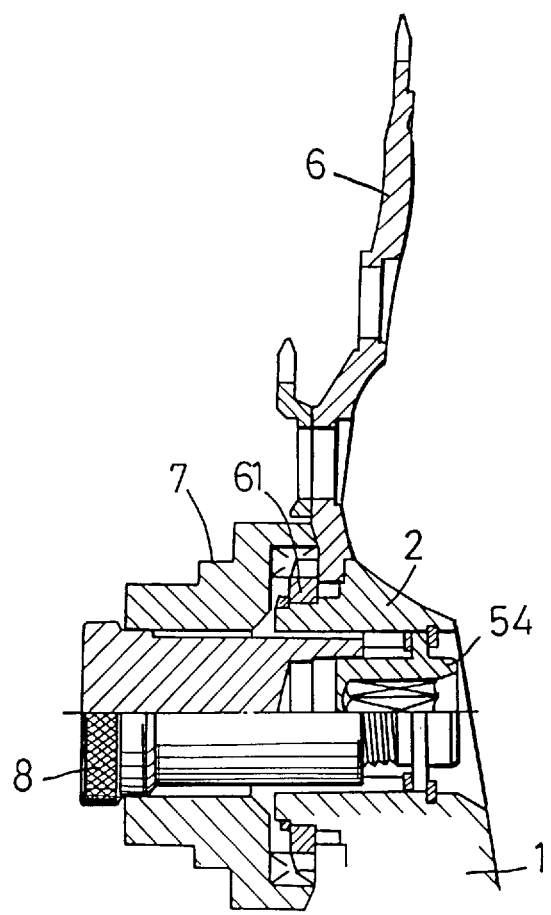
FIG. 12 is a cross sectional view illustrating a main tool and an auxiliary tool according to the present invention used to fix chainwheels to the crank arm shown in FIG. 3.

As shown in FIG. 12, an integrated flange 55 is formed on the head of the bolt 54. When fastening the crank axle 5 and the crank arm 1 together, a washer 56 is inserted and the bolt 54 is tightened. A stop ring 58 is inserted into and retained by a groove 57 located on the inside surface of the crank axle mounting hole 21. To remove the crank arm 1 from the crank axle, a hexagonal Allen key is inserted into the hexagonal hole 59 in the crank arm fixing bolt 54 and turned in the reverse direction. The flange 55 of the bolt 54 then pushes the side surface of the stop ring 58. The flange 55 thus forces the crank arm 1 in the axial direction, so the tight-fitting tapered junctions of the centering members 52A,52 of the crank axle 5 and the centering members 24 of the crank arms 1 can be easily released. Thus, the need for a special tool such as an extractor is obviated.

Figure 8:
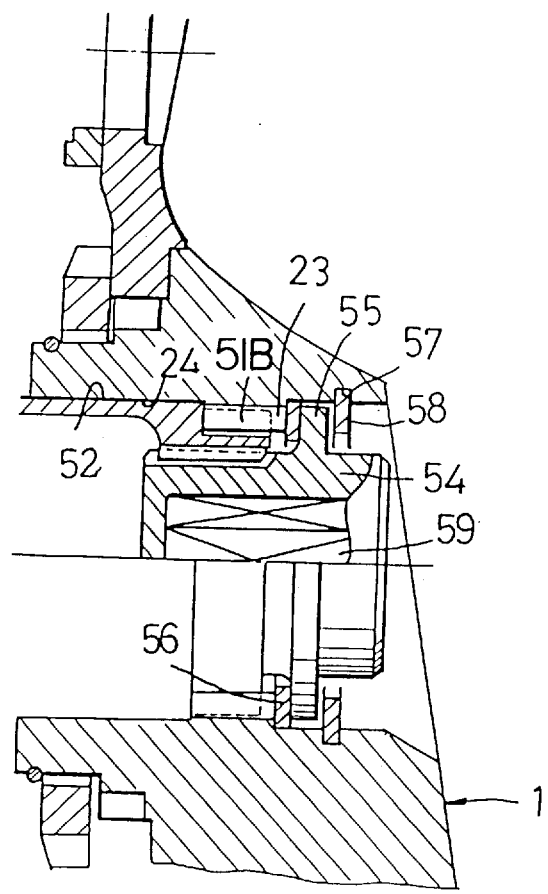
FIG. 8 is a cross sectional view illustrating a particular embodiment of a crank arm assembly according to the present invention including a bolt used to fix the crank arms to the crank axle.
Figure 9:
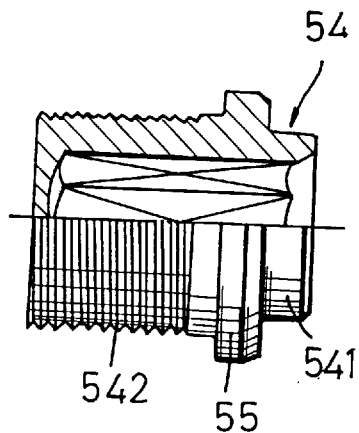
FIG. 9 is a partial cross sectional view of alternative embodiment of the bolt shown in FIG. 8.
Figure 10:
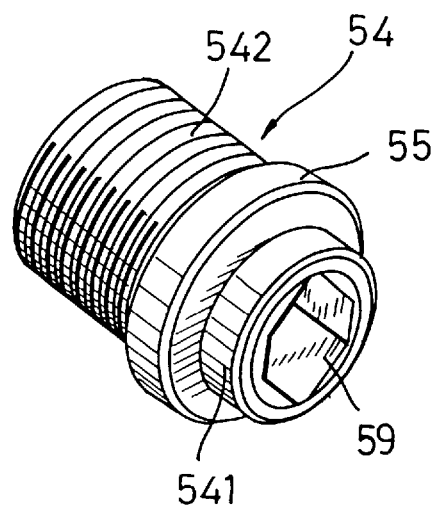
FIG. 10 is an oblique view of the bolt shown in FIG. 9.

FIG. 9 is a partial cross sectional view of alternative embodiment of the bolt shown in FIG. 8, and FIG. 10 is an oblique view of the bolt shown in FIG. 9. In the bolt 54 depicted in FIG. 8, the diameter of the thread section and the diameter of the head are about the same, but in the bolt 54 depicted in FIG. 9 and 10, the diameter of the thread section 542 is greater than the diameter of the head 541, and the diameter of the flange 55 is greater than the diameter of the thread section 542. The provision of a thread section 542 with a large diameter ensures sufficient strength on the part of the thread section even when the component is fabricated from a light alloy such as an aluminum alloy, and affords adequate tightening force on the part of the bolt 54.

A hexagonal hole 59 formed in the center of the end of the head 541 extends in the direction of the bolt axis. The hexagonal hole 59 extends almost to the distal end of the bolt 54, such that its bottom surface is located in proximity to the end surface. A longer hexagonal hole 59 provides a greater area of contact between the tightening tool (an Allen key) and the hexagonal hole 59 so that adequate tightening can be achieved even with a light alloy bolt. The length of the hexagonal hole 59 can be chosen in accordance with the tightening force required, but it is necessary for the length to be at least such that the bottom surface of the hexagonal hole 59 extends to the inside surface of the thread section 542. The diameter of the thread section 542 is rather thick, so the hexagonal hole 59 can extend into its interior; it has adequate strength even when the hexagonal hole 59 is extended into its interior. When fabricated from an aluminum alloy, the bolt 54 has both light weight and adequate strength.

Figure 11:
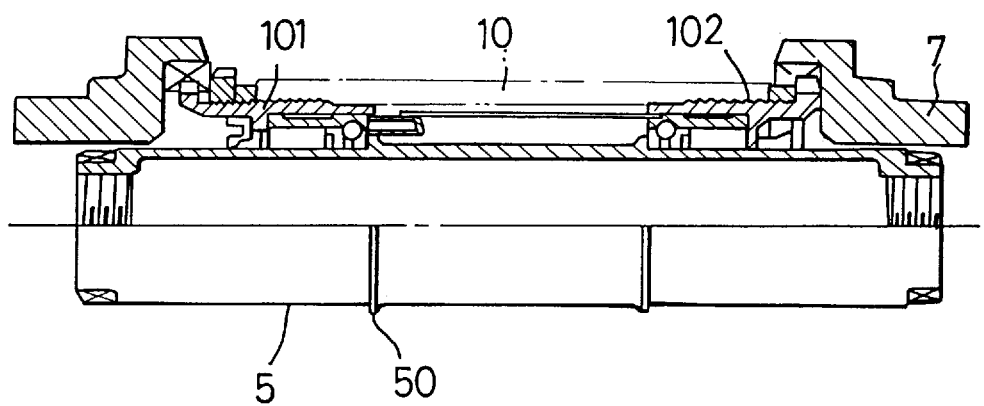
FIG. 11 is a partial cross sectional view of a crank axle according to the present invention mounted to a bicycle frame.

FIG. 11 depicts the crank axle 5 which pertains to the present invention installed in the bicycle frame 10. The crank axle 5 pertaining to this embodiment is provided with a retainer member 50 which protrudes from the center of its outside surface for retaining the bearings. To install the crank axle 5 in the frame 10, a left mounting adapter 101 and a right mounting adapter 102 are threaded between the frame 10 and the crank axle 5 so that the bearings are retained by the retainer members 50. The outsides of the ends of the left mounting adapter 101 and a right mounting adapter 102 are provided with male splines. These male splines mesh with the female splines of the assembly tool 7 so that each adapter can be screwed in.

Figure 13:
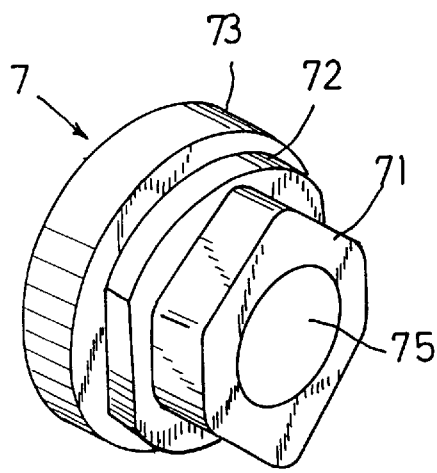
FIG. 13 is an oblique view of the main tool shown in FIG. 12.

The design of an assembly tool 7 is shown in FIG. 13. The end facing the viewer is provided with an essentially regular hexagonal wrench mount member 71. A wrench or other tool is fitted over the wrench mount member 71, and the entire assembly tool 7 is rotated around its axis. A middle section 72 is located adjacent to the wrench mount member 71. The peripheral surface of the middle section 72 is cylindrical, and is cut away at opposing faces to produce flat surfaces. Tools such as wrenches of different sizes can be fitted over the flat sections of the middle section 72. The other end of the assembly tool 7 has a large-diameter section 73.

Figure 14:
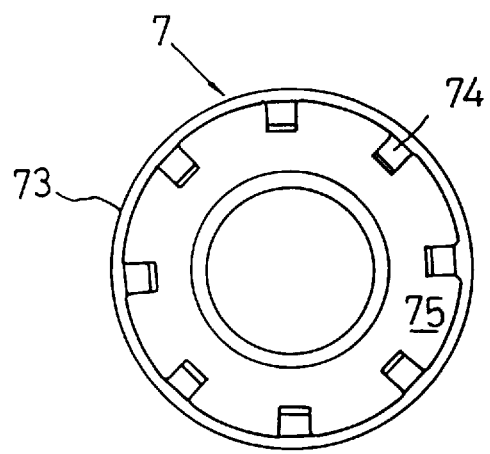
FIG. 14 is an end view of the tool shown in FIG. 13.

FIG. 14 shows the assembly tool 7 viewed from the large-diameter section 73 side. The inside of the large-diameter section 73 takes the form of an open cavity. As shown in FIG. 14, female splines 74 are located in the interior. These female splines 74 mesh with the male splines of the left mounting adapter 101 and the right mounting adapter 102. A through-hole 75 which extends in the axial direction is located in the center of the assembly tool 7. The diameter of the through-hole 75 is such that the end of the crank axle 5 will pass through it. When the left and right mounting adapters are screwed in, the ends of the crank axle 5 are passed through the through-holes 75 so that the crank axle 5 serves as a guide for rotation of the assembly tool 7, thus facilitating the assembly operation.

FIG. 12 shows the crank arm 1 with the chainring 6 attached. As illustrated in FIG. 12, the chainring 6 is mounted onto the crank arm end on the crank axle mounting side 2 of the crank arm 1 and fixed by a nut 61. The peripheral surface of the nut 61 is provided with male splines having the same pitch as the male splines of the left mounting adapter 101 and the right mounting adapter 102, as shown in FIG. 11. Thus, the nut 61 can be tightened using the same assembly tool 7 as that shown in FIG. 11.

Figure 15:
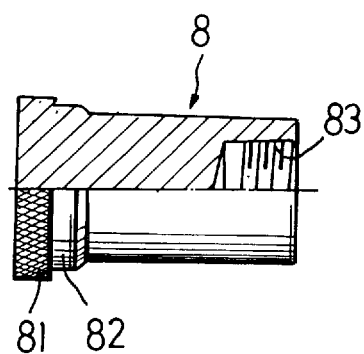
FIG. 15 is a partial cross sectional view of the auxiliary tool shown in FIG. 12.

An auxiliary assembly tool 8 is also used in the tightening operation in order to prevent the assembly tool 7 from coming off during tightening. The design of the auxiliary assembly tool 8 is shown in FIG. 15. One end of the approximately cylindrical auxiliary assembly tool 8 is provided with a grip section 81 whose outside surface has been knurled to prevent slippage. The diameter of the grip section 81 is greater than the diameter of the through-hole 75 of the assembly tool 7, and it is designed to retained the assembly tool 7. A inside surface support section 82 is formed next to the grip section 81. The diameter of the inside surface support section 82 is about the same as the diameter of the end of the crank axle 5. Thus, the inside surface of the through-hole 75 in the assembly tool 7 can be rotatably supported by the inside surface support section 82. The other end of the auxiliary assembly tool 8 is provided with a threaded section 83 into which the bolt 54 can be screwed from the end. The length of the auxiliary assembly tool 8 has been designed such that when the auxiliary assembly tool 8 has been fixed to the crank arm 1 by the bolt 54, there is a slight gap (about 0.5 mm) between the grip section 81 and the assembly tool 7. Thus, the assembly tool 7 is rotatably supported by the auxiliary assembly tool 8 in such a way that it will not come off from the nut 61. Thus, a wrench or other tool can be fitted onto the wrench mount member 71 and the nut 61 can be tightened to fix the chainring 6 to the crank arm 1 while the assembly tool 7 is supported by the auxiliary assembly tool 8. Since the assembly tool 7 is prevented from coming off from the nut 61, the operation may be conducted easily and efficiently.

While the above is a description of various embodiments of the present invention, further modifications may be employed without departing from the spirit and scope of the present invention. For example, in the embodiment shown in FIG. 8, a stop ring 58 was provided in crank arm 1. However, an integrated member which corresponds in function to the stop ring 58 may be formed on the crank arm 1 instead of the stop ring 58, or some other component may be welded on. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A tool for fixing a crank axle (5) to a bicycle frame (10), the crank axle (5) being of the type including an axle body having a plurality of splines (51) disposed at a first end thereof, the tool comprising:

a tool-mount member (71) shaped to be held and turned by a second tool;

wherein the tool-mount member (71) defines an opening (75) for receiving the first end of the axle body therethrough; and an operating member (73) one-piece with the tool-mount member (71) and having a plurality of splines (74) extending radially inwardly from an inside surface thereof.

2. A tool for fixing a chainring to a crank arm assembly of the type wherein a crank axle mounting section (21) of a crank arm (1) mounts to an end of a crank axle (5), the crank axle mounting section (21) including a threaded outer surface (26), and wherein a nut (61) is provided for fixing a chainwheel to the crank axle mounting section (21), the nut (61) including a plurality of nut splines disposed on an outer peripheral surface thereof and a threaded inner peripheral surface for meshing with the threaded outer surface (26) of the crank axle mounting section (21), the tool comprising:

a tool-mount member (71) shaped to be held and turned by a second tool;

wherein the tool-mount member (71) defines an opening (75) for receiving the crank axle (5) therethrough; and an operating member (73) one-piece with the tool-mount member (71) and having a plurality of splines (74) extending radially inwardly from an inside surface thereof for meshing with the plurality of nut splines.

3. The tool according to claim 2 further comprising:

an auxiliary tool (8) having first and second ends, the auxiliary tool (8) including:

a grip section (81) disposed in close proximity to the first end, the grip section (81) having a diameter greater than or equal to a diameter of an end of the crank axle (5);

a support section (82) adjacent to the grip section and having a diameter less than a diameter of the opening (75);

wherein the support section (82) is fitted within the opening (75); and wherein the second end has a threaded inner peripheral surface (83).

4. The tool according to claim 3 wherein the grip section (81) has a knurled surface.

* * * * *